(12) United States Patent
Schwartzentruber et al.

(10) Patent No.: US 9,034,098 B2
(45) Date of Patent: May 19, 2015

(54) HYDRAULIC BINDER WITH LOW CLINKER CONTENT

(75) Inventors: Arnaud Schwartzentruber, Genas (FR); Mylène Martin, Luzinay (FR); Fabrice Pourcel, Saint-just-Chaleyssin (FR)

(73) Assignee: LAFARGE, Paris (FR)

( * ) Notice: Subject to any disclaimer, the term of this patent is extended or adjusted under 35 U.S.C. 154(b) by 0 days.

(21) Appl. No.: 13/981,775

(22) PCT Filed: Jan. 26, 2012

(86) PCT No.: PCT/EP2012/051179
§ 371 (c)(1),
(2), (4) Date: Jul. 25, 2013

(87) PCT Pub. No.: WO2012/101193
PCT Pub. Date: Aug. 2, 2012

(65) Prior Publication Data
US 2013/0298805 A1    Nov. 14, 2013

(30) Foreign Application Priority Data

Jan. 28, 2011 (FR) ...................................... 11 50676

(51) Int. Cl.
*C04B 28/04* (2006.01)
*C04B 28/14* (2006.01)
*C04B 7/04* (2006.01)

(52) U.S. Cl.
CPC . *C04B 7/04* (2013.01); *C04B 28/04* (2013.01); *C04B 28/145* (2013.01)

(58) Field of Classification Search
CPC ............ C04B 7/02; C04B 7/04; C04B 14/06; C04B 14/26; C04B 14/28; C04B 14/106; C04B 14/108; C04B 18/08; C04B 18/141; C04B 18/146; C04B 20/0076; C04B 22/142; C04B 22/143; C04B 28/04; C04B 28/145; C04B 2103/32; C04B 2103/0088
USPC .................................................. 106/715, 739
See application file for complete search history.

(56) References Cited

U.S. PATENT DOCUMENTS 4,328,039 A    5/1982   Masuda

FOREIGN PATENT DOCUMENTS

| CN | 1657465 A | 8/2005 |
|---|---|---|
| EP | 0 641 747 A1 | 3/1995 |
| EP | 0 572 076 B1 | 3/1999 |
| FR | 2462401 A1 | 2/1981 |
| JP | 08-175855 | 7/1996 |
| JP | 09-048649 A * | 2/1997 |
| WO | WO 2006/032785 A2 | 3/2006 |
| WO | WO 2006/032786 A2 | 3/2006 |
| WO | WO 2007/039694 A2 | 4/2007 |
| WO | WO 2010/112687 A2 | 10/2010 |
| WO | WO 2011/134025 A1 * | 11/2011 |

OTHER PUBLICATIONS

Derwent-Acc-No. 2010-Q15323, abstract of Chinese Patent Specification No. CN 101880147 A (Nov. 2010).*
Derwent-Acc-No. 2011-C76808, abstract of Chinese Patent Specification No. CN 101948254A (Jan. 2011).*
Derwent-Acc-No. 2009-A80556, abstract of Chinese Patent Specification No. CN 101081718A (Dec. 2007).*
International Search Report as issued for PCT/EP2012/051179.
Abstract of Mashita Y; Database WPI Week 199637 Thomas Scientific, London, GB; An 1996-367987 XP002660215 & JP 8 175855 A (Mashita Y) Jul. 9, 1996.

* cited by examiner

*Primary Examiner* — Anthony J Green
(74) *Attorney, Agent, or Firm* — Pillsbury Winthrop Shaw Pittman LLP

(57) ABSTRACT

A hydraulic binder includes, in parts by mass: (a) from 20 to 60 parts of Portland clinker; (b) from 20 to 40 parts of slag; and (c) from 0 to 60 parts of inorganic material other than the clinker and the slag; the sum of (a), (b) and (c) being equal to 100 parts; which binder further includes a slag activator including, relative to 100 parts of the sum of (a) and (b): from 1.4 to 6.55 parts of alkali metal salt, expressed as equivalent-$Na_2O$; and from 1.1 to 11.0 parts of calcium sulfate, expressed as $SO_3$.

20 Claims, No Drawings

HYDRAULIC BINDER WITH LOW CLINKER CONTENT

CROSS-REFERENCE TO RELATED APPLICATIONS

This is the U.S. National Stage of PCT/EP2012/051179, filed Jan. 26, 2012, which in turn claims priority to French Patent Application No. 1150676, filed Jan. 28, 2011, the entire contents of both applications are incorporated herein by reference in their entireties.

The invention relates to a hydraulic binder with low clinker content, its preparation and its use.

A hydraulic binder is a material which sets and hardens by hydration, for example a cement. Most conventional hydraulic compositions comprise Portland cement (which itself comprises Portland clinker and calcium sulfate). The main role of the calcium sulfate is to optimize the early age compressive strength. However, the calcium sulfate has little or no effect on compressive strength in the long term.

A known problem of conventional hydraulic compositions is the high emission level of $CO_2$ during their manufacture, mainly during the manufacture of Portland clinker. A known solution to the problem of $CO_2$ emission is to replace a portion of the Portland clinker in hydraulic compositions with other inorganic materials. Consequently, hydraulic compositions with low clinker content have a high mass ratio C/K in which C is the quantity of binder and K is the quantity of clinker, the quantity of binder corresponding to the sum of the clinker and other inorganic materials. One of the most commonly used inorganic materials to replace part of the Portland clinker is slag, and particularly ground granulated blast-furnace slag.

A known problem of hydraulic compositions having a high C/K ratio, and particularly those comprising slag, is a loss of early age compressive strength which is generally measured 24 hours after the hydraulic composition has been mixed with water.

A known solution to solve the problem of loss of early age compressive strength is to add alkali metal salts to the hydraulic composition. However, the drawback of this solution is to decrease long-term compressive strength which is generally measured 28 days after the hydraulic composition has been mixed with water.

It is thus desirable to find another way to increase early age compressive strength of hydraulic compositions having a high C/K ratio, while preventing a reduction of long-term compressive strength.

Unexpectedly, the inventors have demonstrated that it is possible to use alkali metal salts in combination with calcium sulfate in predetermined quantities to retain, or even enhance, the early age compressive strength (24 hours after the hydraulic composition has been mixed) and the long-term compressive strength (28 days after the hydraulic composition has been mixed) of a hydraulic composition having a high C/K ratio and comprising slag.

The present invention seeks to provide new hydraulic binders and compositions with a high C/K ratio which have one or more of the following characteristics:
good early compressive strength 24 hours after the hydraulic composition has been mixed with water, while making it possible to retain, or even enhance, compressive strength 28 days after the hydraulic composition has been mixed;
as the quantity of clinker is less than that of ordinary concrete, particularly C25/30 concrete, reduced $CO_2$ emissions related to the fabrication of the hydraulic composition (A C25/30 concrete is a concrete according to the EN 206-1 standard, whose characteristic compressive strength 28 days after mixing, measured on a 16 cm×32 cm cylinder, is at least 25 MPa, and measured on a 15 cm×15 cm cube, is at least 30 MPa);
Increased long-term compressive strength (28 days after mixing) relative to an addition of calcium sulfate alone;
a good compromise between early age and long-term compressive strength, in contrast to hydraulic compositions of the prior art, which often have a positive effect on the compressive strength of one period of time (24 hours or 28 days after mixing), but have a negative effect on the compressive strength of the other term (respectively 28 days or 24 hours after mixing);
the absence of an adverse effect on the rheology of the hydraulic compositions.

The present invention accordingly provides a hydraulic binder comprising, in parts by mass:
(a). from 20 to 60 parts of Portland clinker;
(b). from 20 to 40 parts of slag;
(c). from 0 to 60 parts of inorganic material other than the clinker and slag;
the sum of (a), (b) and (c) being equal to 100 parts;
which binder further comprises a slag activator comprising (for example consisting of),
relative to 100 parts of the sum of (a) and (b):
from 1.4 to 6.55 parts of alkali metal salt, expressed as equivalent—$Na_2O$; and
from 1.1 to 11.0 parts of calcium sulfate, expressed as $SO_3$.

Preferably, the hydraulic binder comprises from 20 to 55, more preferably from 20 to 50 parts of Portland clinker.

Portland clinker is obtained by clinkering at high temperature a mixture comprising limestone and, for example, clay. It is defined in terms of cement in the NF EN 197-1 standard.

Preferably, the Blaine specific surface of the Portland clinker (which is preferably ultrafine) used in the present invention is greater than or equal to 5500, more preferably greater than or equal to 6000, most preferably greater than or equal to 6500 $cm^2/g$.

Portland clinker may be ground and optionally separated (for example with a dynamic separator) in order to obtain a clinker having for example a Blaine specific surface greater than or equal to 5500 $cm^2/g$. The clinker may be, for example, ground in two steps. In a first step, the clinker can first be ground to a Blaine specific surface of 3500 to 4000 $cm^2/g$. A high-efficiency separator, referred to as second or third generation, may be used in this first step to separate the clinker having the desired fineness and the clinker needing to be returned to the grinder. In a second step, the clinker may first go through a very high efficiency separator, referred to as very high fineness (VHF) in order to separate the clinker particles having a Blaine specific surface greater than or equal to 5500 $cm^2/g$ and the clinker particles having a Blaine specific surface less than 5500 $cm^2/g$. The clinker particles having a Blaine specific surface greater than or equal to 5500 $cm^2/g$ may be used as they are. The clinker particles having a Blaine specific surface less than 5500 $cm^2/g$ may be ground until the required Blaine specific surface has been achieved. The grinders which can be used in the two steps include, for example, a ball mill, a vertical mill, a roller press, a horizontal mill (for example a Horomill©) or a stirred vertical grinder (for example a Tower Mill).

Preferably, the hydraulic binder according to the present invention comprises less than 40, for example 20 to 39.5, more preferably 20 to 35 parts of slag.

The slag is preferably blast furnace slag, for example ground granulated blast furnace slag. Preferably, the slag has a Blaine specific surface greater than or equal to 3000 $cm^2/g$.

The fineness of the slag may be increased, for example to 10400 cm²/g of Blaine specific surface or more, for example to 11000 cm²/g in order to allow a reduction in the quantity of slag used while retaining an equivalent performance, particularly compressive strength.

Preferably, the hydraulic binder according to the present invention comprises from 5 to 60, more preferably from 10 to 60 parts of inorganic material.

The inorganic materials used in the hydraulic binders of the invention are generally mineral materials in the form of particles having a Dv90 less than or equal to 200 μm, and preferably a Dv97 less than or equal to 200 μm. The mineral materials can be natural or derived from industrial processes. They include materials which are inert or have low hydraulic or pozzolanic properties. They preferably do not have a negative impact on the water demand of the hydraulic binders, on the compressive strength of the hydraulic compositions, and/or on the anti-corrosion protection of reinforcements.

Hydraulic binders and hydraulic compositions comprise several different components having various sizes. It can be advantageous to seek to associate components whose respective sizes complement one another, that is, for the components with the smallest particles to be able to sandwich themselves between the components with the largest particles. For example, the inorganic materials used in the present invention can be used as filling materials, which means that they can fill the voids between the other components whose particles have larger sizes.

Preferably, the inorganic materials used according to the present invention are mineral additions. Mineral additions are, for example, pozzolans (for example as defined in the "cement" standard NF EN 197-1 standard, paragraph 5.2.3), fly ash (for example as defined by the "cement" NF EN 197-1 standard, paragraph 5.2.4), calcined shales (for example as defined by the "cement" NF EN 197-1 standard, paragraph 5.2.5), calcium carbonate (for example limestone as defined by the "cement" NF EN 197-1 standard, paragraph 5.2.6), silica fume (for example as defined by the "cement" NF EN 197-1 standard, paragraph 5.2.7), metakaolin or mixtures thereof.

Preferably, the inorganic materials do not comprise fly ash.

If the inorganic material is fly ash, then the quantity of alkali metal salts is preferably less than or equal to 4.5 parts, expressed as parts by mass of equivalent—$Na_2O$ relative to 100 parts by mass of Portland clinker and slag.

Preferably, the inorganic material comprises calcium carbonate, for example limestone, particularly crushed and/or ground limestone.

Although the inorganic material may comprise a binding material, the optimization (particularly in terms of cost) of the hydraulic compositions according to the invention leads to a preference for the inorganic materials being inert fillers, that is, non-binding materials (without hydraulic or pozzolanic activity).

Preferably, the alkali metal salt is a sodium, potassium or lithium salt or a mixture thereof, more preferably a sodium salt.

The anion in the alkali metal salt is preferably sulfate. The alkali metal salt is preferably sodium sulfate.

The alkali metal salt is preferably non-hygroscopic. The alkali metal salt is preferably not an alkali metal hydroxide: the hydroxides can be hazardous to health and, in powder form, are hygroscopic which leads to undesirable absorption of moisture from the air which would cause the binder of the invention to go pasty.

Preferably, the quantity of alkali metal salt is from 1.5 to 6 parts, more preferably from 2 to 5.5 parts, most preferably from 2.5 to 4.5 parts, expressed as parts by mass of equivalent—$Na_2O$ relative to 100 parts of Portland clinker and slag.

Alkali metal salt already present in the clinker must not be taken into account to determine the quantity of alkali metal salt used according to the present invention. Added alkali metal salt alone is to be considered.

Calcium sulfate used according to the present invention includes gypsum (calcium sulfate dihydrate, $CaSO_4.2H_2O$), hemi-hydrate ($CaSO_4.\tfrac{1}{2}H_2O$), anhydrite (anhydrous calcium sulfate, $CaSO_4$) or a mixture thereof. The gypsum and anhydrite exist in the natural state. Calcium sulfate produced as a by-product of certain industrial processes may also be used.

Preferably, the quantity of calcium sulfate used according to the present invention is from 2 to 10 parts, more preferably from 3 to 9 parts, expressed as parts by mass of $SO_3$ relative to 100 parts of Portland clinker and slag.

The present invention also provides a hydraulic composition comprising a hydraulic binder according to the invention, aggregate and water, preferably:
- 1 part by mass of the hydraulic binder according to the present invention;
- from 2 to 10 parts by mass of aggregate; and
- from 0.25 to 0.7 parts by mass of effective water.

The hydraulic compositions of the invention include both fresh and hardened compositions, for example a cement slurry, a mortar or a concrete.

The composition may also comprise an admixture, for example in accordance with the EN 934-2, EN 934-3 or EN 934-4 standards, and optionally mineral additions.

Aggregates used in the compositions of the invention include sand (whose particles generally have a maximum size (Dmax) of less than or equal to 4 mm), and gravel (whose particles generally have a minimum size (Dmin) greater than 4 mm and a Dmax less than or equal to 20 mm or more).

The aggregates include calcareous, siliceous, and silico-calcareous materials. They include natural, artificial, waste and recycled materials. The aggregates may also comprise, for example, wood.

The effective water is the water required to hydrate the hydraulic binder and to provide fluidity of a hydraulic composition obtained in the fresh state. The total water represents the totality of the water present in the mix (at the time of mixing) and comprises the effective water and the water absorbable by the aggregates. Effective water and its calculation is discussed in the EN 206-1 standard, page 17, paragraph 3.1.30.

The quantity of absorbable water is deduced from the coefficient of absorption of the aggregates measured according to the NF EN 1097-6 standard, page 6 paragraph 3.6 and the associated annex B. The absorption coefficient of water is the ratio of the increase in mass of a sample of aggregates, initially dry then submerged during 24 hours in water, relative to its dry mass, because of the water penetrating in the pores accessible to the water.

The hydraulic compositions according to the invention preferably also comprise a concrete admixture, for example an accelerator, an air-entraining agent, a viscosity modifying agent, a retarder, a clay inertant, a plasticizer and/or a superplasticizer. In particular, it is useful to include a polycarboxylate superplasticizer, in particular from 0.05 to 1.5%, preferably from 0.1 to 0.8%, by mass.

Clay inertants are compounds which permit the reduction or prevention of the harmful effect of clays on the properties of hydraulic binders. Clay inertants include those described in WO 2006/032785 and WO 2006/032786.

The term superplasticizer as used in this specification and the accompanying claims is to be understood as including both water reducers and superplasticizers as described in the Concrete Admixtures Handbook, Properties Science and Technology, V.S. Ramachandran, Noyes Publications, 1984.

A water reducer is defined as an additive which reduces the amount of mixing water of concrete for a given workability by typically 10-15%. Water reducers include, for example lignosulphonates, hydroxycarboxylic acids, carbohydrates, and other specialized organic compounds, for example glycerol, polyvinyl alcohol, sodium alumino-methyl-siliconate, sulfanilic acid and casein.

Superplasticizers belong to a new class of water reducers chemically different from the normal water reducers and capable of reducing water contents by about 30%. The superplasticizers have been broadly classified into four groups: sulphonated naphthalene formaldehyde condensate (SNF) (generally a sodium salt); sulphonated melamine formaldehyde condensate (SMF); modified lignosulfonates (MLS); and others. More recent superplasticizers include polycarboxylic compounds such as polycarboxylates, e.g. polyacrylates. The superplasticizer is preferably a new generation superplasticizer, for example a copolymer containing polyethylene glycol as graft chain and carboxylic functions in the main chain such as a polycarboxylic ether. Sodium polycarboxylate-polysulphonates and sodium polyacrylates may also be used. Phosphonic acid derivatives may also be used. The amount of superplasticizer required generally depends on the reactivity of the cement. The lower the reactivity the lower the amount of superplasticizer required. In order to reduce the total alkali content the superplasticizer may be used as a calcium rather than a sodium salt.

The present invention also provides a process for preparing a hydraulic composition according to the present invention which process comprises contacting a hydraulic binder according to the invention, aggregate and water.

Mixing may be effected, for example, by known methods.

The different components of the hydraulic composition according to the present invention may be added together or separately.

In one embodiment of the invention the hydraulic binder is prepared during a first step, and the aggregates and water are added during a second step.

It is also possible to use a CEM I-type cement in accordance with the EN 197-1 standard which comprises Portland clinker and calcium sulfate, or a blended cement which may comprise Portland clinker, calcium sulfate, and a mineral addition, such as slag and/or fly ash and/or limestone. If a CEM I-type cement or a blended cement are used, the respective quantities of each of the components must thus be adjusted in order to obtain the hydraulic binder or the hydraulic composition according to the present invention.

The hydraulic composition according to the present invention may be shaped to produce, after hydration and hardening a shaped article for the construction field. Such shaped articles also constitute a feature of the invention. Components for the construction field include, for example, a slab, a floor, a screed, a foundation, a base, a shear wall, a beam, a work top, a pillar, a bridge pier, a block of foamed concrete, a pipe, a conduit, a post, a stair, a panel, a cornice, a mold, a road system component (for example a border of a pavement), a roof tile, a surfacing (for example of a road), a jointing plaster (for example for a wall) and an insulating component (acoustic and/or thermal).

The present invention also provides the use, to increase the compressive strength 24 hours after mixing and/or 28 days after mixing of a hydraulic composition which comprises aggregate, water and a hydraulic binder comprising, in parts by mass:

(a) from 20 to 60 parts of Portland clinker;
(b) from 20 to 40 parts of slag; and
(c) from 0 to 60 parts of inorganic material other than the clinker and the slag;

the sum of (a), (b) and (c) being equal to 100 parts;
of a slag activator comprising 1.4 to 6.55 parts of alkali metal salts, expressed as equivalent—$Na_2O$, and 1.1 to 11.0 parts of calcium sulfate, expressed as $SO_3$, all parts being by mass and relative to 100 parts of Portland clinker and of slag.

In this specification, including the accompanying claims:

The Dv97 is the $97^{th}$ percentile of the size distribution of the particles, by volume; that is, 97% of the particles have a size that is less than or equal to Dv97 and 3% of the particles have a size that is greater than Dv97. The Dv50 is defined in a similar manner. Particle size distributions and particle sizes less than about 200 μm are as measured using a Malvern MS2000 laser granulometer. Measurement is effected in ethanol. The light source consists of a red He—Ne laser (632 nm) and a blue diode (466 nm). The optical model is that of Mie and the calculation matrix is of the polydisperse type.

The apparatus is checked before each working session by means of a standard sample (Sifraco C10 silica) for which the particle size distribution is known.

Measurements are performed with the following parameters: pump speed 2300 rpm and stirrer speed 800 rpm. The sample is introduced in order to establish an obscuration between 10 and 20%. Measurement is effected after stabilisation of the obscuration. Ultrasound at 80% is first applied for 1 minute to ensure the de-agglomeration of the sample. After about 30 s (for possible air bubbles to clear), a measurement is carried out for 15 s (15000 analysed images). Without emptying the cell, measurement is repeated at least twice to verify the stability of the result and elimination of possible bubbles.

All values given in the description and the specified ranges correspond to average values obtained with ultrasound.

Particle sizes greater than 200 μm are generally determined by sieving.

The BET specific surface of powders is measured as follows. A sample of powder of the following mass is taken: 0.1 to 0.2 g for an estimated specific surface of more than 30 $m^2/g$; 0.3 g for an estimated specific surface area of 10-30 $m^2/g$; 1 g for an estimated specific surface area of 3-10 $m^2/g$; 1.5 g for an estimated specific surface area of 2-3 $m^2/g$; 2 g for an estimated specific surface area of 1.5-2 $m^2/g$; 3 g for an estimated specific surface area of 1-1.5 $m^2/g$.

A cell of 3 $cm^3$ or 9 $cm^3$ is used depending on the volume of the sample. The measurement cell assembly is weighed (cell+glass rod). Then the sample is added to the cell: the product must not be less than one millimeter from the top of the throat of the cell. The assembly is weighed (cell+glass rod+sample). The measurement cell is placed in a degassing unit and the sample is degassed. Degassing parameters are 30 min/45° C. for Portland cement, gypsum, pozzolans; 3 h/200° C. for slags, silica fume, fly ash, alumina cement, limestone; and 4 h/300° C. for a control sample of alumina. The cell is rapidly closed with a stopper after degassing. The assembly is weighed and the result recorded. All weighing is carried out without the stopper. The mass of the sample is obtained by subtracting the mass of the cell from the mass of the cell+ degassed sample.

Analysis of the sample is then carried out after placing it in the measurement unit. The analyzer is a Beckman Coulter SA 3100. Measurement is based on the adsorption of nitrogen by the sample at a given temperature, in this case the temperature of liquid nitrogen i.e. −196° C. The device measures the pressure of the reference cell in which the adsorbate is at its saturation vapor pressure and that of the sample cell in which known volumes of adsorbate are injected. The resulting curve of these measurements is the adsorption isotherm. In the measurement method, it is necessary to know the dead space volume of the cell: measurement of this volume is therefore carried out with helium before the analysis.

The sample mass previously calculated is entered as a parameter. The BET specific surface is determined by the software by linear regression from the experimental curve. The reproducibility standard deviation obtained from 10 measurements on a silica of specific surface 21.4 m$^2$/g is 0.07. The reproducibility standard deviation obtained from 10 measurements on a cement of specific surface area 0.9 m$^2$/g is 0.02. A control is carried out once every two weeks on a reference product. Twice yearly, a control is carried out with the control alumina supplied by the manufacturer.

The Blaine specific surface is determined in accordance with the EN 196-6 standard, paragraph 4. The Blaine specific surface of a particulate material is determined by using a measuring apparatus which comprises: a cylindrical measuring cell with an internal diameter of 12.7±0.1 mm; a close-fitting perforated metal disk at the bottom of the cell; a piston which slides in the measuring cell and which is stopped at a distance of 15 mm±1 mm from the top surface of the perforated disk to the base of the piston when the piston is depressed; the piston allows the passage of air; a manometer which comprises a U-shaped glass tube, one branch of which is attached to the bottom of the measuring cell, the same branch comprising an engraved line with a further three engraved lines generally spaced 15, 70 and 110 m above it and a T-junction to a side tube which is connected above the topmost engraved line on the tube via a valve to a suction means (such as a rubber tube and a suction bulb).

The inner surface of the manometer is wetted with a manometric liquid (for example dibutyl phthalate). The manometer is then filled with the manometric liquid up to the lowest engraved line.

A filter paper disk is placed on the perforated disk in the measuring cell; the sample is placed in the cell; a second filter paper disk is placed on top of the sample which is then compacted using the piston.

The porosity of the bed of material (e) in the measuring cell is derived from the mass of material (m in g), the material density (ρ in g/cm$^3$), and the total volume of the bed of compacted material (V in cm$^3$) using the formula: m=ρ×V× (1−e).

The density of the material is determined using a pycnometer.

The volume of the bed of material is determined by measuring the difference between the amount of mercury required to fill the empty cell and the amount to fill the space above the sample to be tested.

The measurement of air permeability is conducted using an amount of material sufficient to give a bed porosity e=0.500. With the top of the measuring cell capped the level of the manometric liquid is adjusted to the highest engraved line using the suction means and valve. The cap is then removed to allow air to permeate through the bed of test material. As air flows through the bed the level of the manometric liquid falls. The time (t) for the liquid to fall from the third engraved line to the second is measured. The procedure is carried out at 20±2° C. and a relative humidity of ≤65%. The temperature for each measurement is measured and an average value taken.

The procedure is carried out on a second sample of material, twice for each sample. The procedure is also carried out on three samples of a reference material of known Blaine specific surface.

The Blaine specific surface (S) of the material is calculated using the formula:

$$S = \frac{\rho_o}{\rho} \times \frac{(1-e_o)}{(1-e)} \times \frac{\sqrt{e^3}}{\sqrt{e_o^3}} \times \frac{\sqrt{0,1\eta_o}}{\sqrt{0,1\eta}} \times \frac{\sqrt{t}}{\sqrt{t_o}} \times S_o$$

in which:
$S_o$=surface mass of the reference material (cm$^2$/g),
e=porosity of the material tested,
$e_o$=porosity of the reference material
t=average time measured for the tested material(s)
$t_o$=average of the three times measured for the reference material(s)
ρ=density of the test material (g/cm$^3$),
$\rho_o$=density of the reference material (g/cm$^3$),
η=viscosity of air at the test temperature for the tested material (Pa)
$\eta_o$=viscosity of air at the test temperature for the reference material (Pa).

In this specification, including the accompanying claims, percentages and parts are by mass, unless otherwise specified.

The following non-limiting Examples illustrate the invention.

EXAMPLES

Materials

Cement: two CEM I 52.5 cements were used (supplier Lafarge Ciment—Saint-Pierre La Cour, referred to as "SPLC"); one of which had a Blaine specific surface of 7041 cm$^2$/g (Dv97=16 μm) and the other had a Blaine specific surface of 6543 cm$^2$/g (Dv97=19 μm).

Slag: slag from Fos sur Mer (Fos), industrially ground to 3400 cm$^2$/g or 10400 cm$^2$/g (Blaine) was used.

Inorganic materials: a limestone (BL200, supplier Omya) which had a specific BET surface of 0.86 m$^2$/g and a methylene blue value $MB_F$ of 0.3 g/100 g in accordance with NF EN 933-9 standard.

Calcium sulfate: an anhydrite II from the Lafarge quarry of Mazan, ground to a Dv50 of 6 μm or 4.5 μm was used.

Alkali metal salts: $Na_2SO_4$ (anhydrous) in powder form (purity at 99.98%; supplier VWR).

Admixture: the plasticizer sold under the commercial name Prelom 300 (polycarboxylate supplied by BASF).

Aggregates: (all supplied by Lafarge):
Sand 0/5 R St Bonnet quarry;
Gravel 6.3/10 CC Cassis quarry;
Sand 0/1 R St Bonnet quarry;
Gravel 5/10 Cassis quarry;
(each aggregate is characterized by two figures: the first one corresponds to the "d" as defined in the XPP 18-545 standard and the second one corresponds to "D" as defined in the XPP 18-545 standard);

Formulations of Hydraulic Compositions According to the Invention

The formulations which follow in Tables 1 and 2 hereinafter are concrete compositions according to the invention (Compositions 1 to 9), with the exception of reference formulations which are controls without sulfates and without alkali metal salts (Control 1 and Control 2). The materials used were those described above.

The tested concretes were manufactured according to the protocol described hereinafter:
1) introduction of the aggregates, then of the other powders (cement, slag, limestone, anhydrite II and Na$_2$SO$_4$) in the mixing bowl of a planetary mixer Rayneri R201 having a drum with a 10 L capacity and a reinforced blade with a shape of a "sage leaf" having a thickness of 12 mm; the raw materials are stored at 20° C. for at least 24 hours before mixing;
2) mixing at speed 1 for 30 seconds;
3) stopping of the stirring, opening of the protective grid and introduction of the mixing water comprising the admixture (tempered at 20° C.) in a single operation;
4) closing of the protective grid and restarting of the mixing at speed 1;
5) after 4 minutes of mixing, the mixer is stopped, the mixing having been completed.

Performances of the Concretes According to the Invention

The compressive strength of the formulations were measured in accordance with the EN 12390-3 standard. The compressive strength was measured with cylindrical samples having a 70-mm diameter and a ratio of height to diameter of 2, fabricated and retained in accordance to the EN 12390-2 standard. For compressive strengths at 28 days, the samples were rectified before the measurements according to the EN 12390-3 standard. For compressive strengths at 24 hours, the samples were sulfited before the measurements in accordance with the sulfur mortar method in accordance to the EN 12390-3 standard. The press used (Controlab C12004 of 250 kN of class 1) was in accordance to EN 12390-4 standard. The loading up to compression failure was carried out at a speed of 3.85 kN/s (namely a speed of 1 MPa/s for a cylindrical sample having a 70-mm diameter).

The results of the measurements of compressive strength are shown in Tables 1 and 2 hereinafter. These results are the mean deviation of three measurements, rounded off to the closest tenth.

TABLE 1

Detail of the compositions and compressive strengths (Rc) of a reference formulation (Control 1) and of formulations according to the invention (Composition 1, Composition 2 and Composition 3) comprising a slag having a Blaine specific surface of 3400 cm$^2$/g

| | | Control 1 | Composition 1 | Composition 2 | Composition 3 |
|---|---|---|---|---|---|
| Limestone BL200 | | 107.3 | 82.3 | 82.3 | 72.3 |
| Anhydrite II Dv50 = 6 μm | | 0 | 10 | 15 | 20 |
| Na$_2$SO$_4$ | | 0 | 15 | 10 | 15 |
| Calcium Sulfate expressed as | SO$_3$ (%/ clinker + slag) | 0.6 | 3.1 | 4.3 | 5.5 |
| Alkali metal salt expressed as | Na$_2$Oeq. (%/ clinker + slag) | 0.0 | 2.8 | 1.8 | 2.8 |
| Rc 24 hours (MPa) | | 4.7 | 7.9 | 7.0 | 7.1 |
| Rc 28 days (MPa) | | 34.2 | 37.4 | 38.3 | 39.4 |

All quantities in Tables 1 and 2, unless otherwise specified, are expressed in grams.

Each composition described in Table 1 hereinabove further comprises:
- 920 g of sand 0/5 R St Bonnet;
- 920 g of gravel 6.3/10 CC cassis;
- 120 g of cement SPLC (Dv97=16 μm) comprising 117.4 g of Portland clinker, 2.0 g of hemihydrate and 0.6 g of gypsum;
- 120 g of slag Fos 3400 cm$^2$/g;
- 163.1 g of effective water; and
- 3.1 g of Prelom 300.

According to Table 1 hereinabove, adding calcium sulfate and alkali metal salts to a composition results in a composition having increased compressive strength 24 hours after mixing and 28 days after mixing.

TABLE 2

Detail of the compositions and compressive strengths (Rc) of a reference formulation (Control 2) and of formulations according to the invention (Composition 4, Composition 5, Composition 6, Composition 7, Composition 8 and Composition 9) comprising a slag having a Blaine specific surface of 10400 cm$^2$/g

| | | Control 2 | Comp. 4 | Comp. 5 | Comp. 6 | Comp. 7 | Comp. 8 | Comp. 9 |
|---|---|---|---|---|---|---|---|---|
| Cement SPLC Dv97 = 19 μm | Portland clinker | 77.7 | 77.7 | 77.7 | 78.2 | 78.2 | 78.2 | 78.2 |
| | Hemi-hydrate | 1.4 | 1.4 | 1.4 | 1.4 | 1.4 | 1.4 | 1.4 |
| | Gypsum | 0.96 | 0.96 | 0.96 | 0.4 | 0.4 | 0.4 | 0.4 |
| Calcaire BL200 | | 178.2 | 151.1 | 161.3 | 160.9 | 161.4 | 158.8 | 160.7 |
| Anhydrite II Dv50 = 4.5 μm | | 0 | 22.7 | 8.5 | 8.9 | 8.9 | 8.9 | 8.9 |
| Na$_2$SO$_4$ | | 0 | 5.5 | 8.7 | 8.7 | 0 | 0 | 0 |
| Li$_2$SO$_4$ | | 0 | 0 | 0 | 0 | 6.7 | 0 | 0 |
| K$_2$SO$_4$ | | 0 | 0 | 0 | 0 | 0 | 10.7 | 0 |
| NaCl | | 0 | 0 | 0 | 0 | 0 | 0 | 7.2 |
| Prelom 300 | | 2.2 | 2.9 | 2.9 | 2.9 | 3.2 | 4.0 | 2.7 |
| Calcium sulfate expressed as | SO$_3$ (%/ clinker + slag) | 0.8 | 9.2 | 3.9 | 3.9 | 3.9 | 3.9 | 3.9 |
| Alkali metal salt expressed as | Na$_2$Oeq (%/ clinker + slag) | 0 | 1.5 | 2.4 | 2.4 | 2.4 | 2.4 | 2.4 |
| Rc 24 hours (MPa) | | 2.7 | 4.5 | 8.4 | 8.6 | 7.8 | 5.8 | 6.5 |
| Rc 28 days (MPa) | | 28.6 | 31.1 | 30.7 | 32.0 | 31.4 | 32.6 | 30.5 |

In Table 1 and Table 2 hereinabove, the quantity of equivalent—$Na_2O$ in grams was determined according to the following formula:

$$Na_2Oeq = Na_2O + (0.658 \times K_2O) + (2.08 \times Li_2O)$$

wherein $Na_2O$, $K_2O$, and $Li_2O$ represent the mass of $Na_2O$, $K_2O$, and $Li_2O$ in grams
respectively, brought by the alkali metal salt.

In Table 1 and Table 2 hereinabove, the quantity of $SO_3$ in grams was determined by taking into account the fact that, in gypsum, whose chemical formula is $CaSO_4 \cdot 2H_2O$, the mass of $SO_3$ represents 46.5% of the total mass. Similarly, in the hemi-hydrate, whose chemical formula is $CaSO_4 \cdot \frac{1}{2}H_2O$, the mass of $SO_3$ represents 55.2% of the total mass. Similarly, in anhydrite, whose chemical formula is $CaSO_4$, the mass of $SO_3$ represents 58.8% of the total mass.

Each composition described in Table 2 hereinabove further comprises:
- 596 g of sand 0/1 R St Bonnet;
- 271 g of sand 0/5 R St Bonnet;
- 869 g of gravel 5/10 cassis;
- 80 g of slag Fos 10400 $cm^2/g$; and
- 156.4 g of effective water.

According to Table 2 hereinabove, adding calcium sulfate and alkali metal salts to a composition results in a composition having increased compressive strength 24 hours after mixing and 28 days after mixing.

Compositions 7, 8 and 9 comprise alkali metal salts other than $Na_2SO_4$ (respectively $Li_2SO_4$, $K_2SO_4$ and NaCl). In each case, it was possible to obtain compressive strengths 24 hours after mixing (respectively 7.8, 5.8 and 6.5 MPa) and 28 days after mixing (respectively 31.4, 32.6 and 30.5 MPa) greater than the compressive strengths of the reference composition Control 2 (2.7 MPa 24 hours after mixing and 28.6 MPa 28 days after mixing).

The invention claimed is:

1. Hydraulic binder comprising, in parts by mass:
   (a) from 20 to 60 parts of Portland clinker;
   (b) from 20 to 40 parts of slag;
   (c) greater than 0 and up to 60 parts of inorganic material other than the clinker and the slag; the inorganic material comprising a pozzolan, calcined shale, calcium carbonate, silica fume, metakaolin or a mixture thereof;
   the sum of (a), (b) and (c) being equal to 100 parts; and
   a slag activator comprising, relative to 100 parts of the sum of (a) and (b):
      from 1.4 to 6.55 parts of alkali metal salt, expressed as equivalent-$Na_2O$; and from 1.1 to 11.0 parts of calcium sulfate, expressed as $SO_3$;
   which binder comprises no fly ash,
   wherein the inorganic material is made of particles having a Dv90 less than or equal to 200 µm, wherein Dv90 is the $90^{th}$ percentile of the size distribution of the particles of the inorganic material, by volume.

2. A hydraulic binder according to claim 1, wherein the Blaine specific surface of the Portland clinker is greater than or equal to 5500 $cm^2/g$.

3. A hydraulic binder according to claim 1, wherein the alkali metal salt is sodium sulfate.

4. A hydraulic binder according to claim 1, wherein the inorganic material comprises calcium carbonate.

5. A hydraulic binder according to claim 1, comprising no alkali metal hydroxide.

6. A hydraulic composition comprising a hydraulic binder according to claim 1, aggregate and water.

7. A process for preparing a hydraulic composition according to claim 6, which process comprises mixing a hydraulic binder according to claim 1, aggregate and water.

8. A shaped article for the construction field comprising a hydraulic binder according to claim 1.

9. A hydraulic binder according to claim 1, wherein the amount of slag is from 20 to 35 parts.

10. A hydraulic binder according to claim 1, wherein the slag has a blain specific surface greater than or equal to 3000 $cm^2/g$.

11. A hydraulic binder according to claim 1, wherein the amount of the inorganic material is from 5 to 60 parts.

12. A hydraulic binder according to claim 11, wherein the amount of the inorganic material is from 10 to 60 parts.

13. A hydraulic binder according to claim 1, wherein the inorganic material is made of particles having a Dv97 less than or equal to 200 µm, wherein Dv97 is the $97^{th}$ percentile of the size distribution of the particles of the inorganic material, by volume.

14. A hydraulic binder according to claim 1, wherein the amount of alkali metal salt is from 2 to 5.5 parts.

15. A hydraulic binder according to claim 14, wherein the amount of alkali metal salt is from 2.5 to 4.5 parts.

16. A process comprising increasing the compressive strength 24 hours after mixing and/or 28 days after mixing of a hydraulic composition which comprises aggregate, water and a hydraulic binder comprising, in parts by mass:
   (a) from 20 to 60 parts of Portland clinker;
   (b) from 20 to 40 parts of slag; and
   (c) greater than 0 and up to 60 parts of inorganic material other than the clinker and the slag; the inorganic material comprising a pozzolan, calcined shale, calcium carbonate, silica fume, metakaolin or a mixture thereof;
   the sum of (a), (b) and (c) being equal to 100 parts;
   which binder comprises no fly ash;
   with a slag activator comprising 1.4 to 6.55 parts of alkali metal salt, expressed as equivalent-$Na_2O$, and 1.1 to 11.0 parts of calcium sulfate, expressed as $SO_3$ all parts being by mass and relative to 100 parts of Portland clinker and of slag,
   wherein the inorganic material is made of particles having a Dv90 less than or equal to 200 µm, wherein Dv90 is the $90^{th}$ percentile of the size distribution of the particles of the inorganic material, by volume.

17. A process according to claim 16, wherein the amount of the inorganic material is from 5 to 60 parts.

18. A process according to claim 17, wherein the amount of the inorganic material is from 10 to 60 parts.

19. A process according to claim 16, wherein the inorganic material is made of particles having a Dv97 less than or equal to 200 µm, wherein Dv97 is the $97^{th}$ percentile of the size distribution of the particles of the inorganic material, by volume.

20. A process according to claim 16, wherein the Blaine specific surface of the Portland clinker is greater than or equal to 5500 $cm^2/g$.

* * * * *